(12) United States Patent
Ikegaya et al.

(10) Patent No.: US 7,904,426 B2
(45) Date of Patent: Mar. 8, 2011

(54) SYSTEM AND METHOD FOR IDENTIFYING A REMOVABLE STORAGE DEVICE

(75) Inventors: Naoko Ikegaya, Tokyo (JP); Yasunori Kaneda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 365 days.

(21) Appl. No.: 11/652,997

(22) Filed: Jan. 12, 2007

(65) Prior Publication Data

US 2007/0130234 A1    Jun. 7, 2007

Related U.S. Application Data

(62) Division of application No. 10/789,771, filed on Feb. 27, 2004, now Pat. No. 7,219,092.

(30) Foreign Application Priority Data

Mar. 28, 2003    (JP) .................................. 2003-091225

(51) Int. Cl.
*G06F 17/00* (2006.01)
(52) U.S. Cl. ......................................................... 707/665
(58) Field of Classification Search .................. 707/204, 707/665
See application file for complete search history.

(56) References Cited

U.S. PATENT DOCUMENTS

| | | | |
|---|---|---|---|
| 5,276,867 A | 1/1994 | Kenley | |
| 5,359,512 A | 10/1994 | Nishihara | |
| 5,564,037 A | 10/1996 | Lam | |
| 5,644,736 A | 7/1997 | Healy et al. | |
| 5,819,296 A | 10/1998 | Anderson et al. | |
| 5,835,954 A | 11/1998 | Duyanovich et al. | |
| 5,991,753 A | 11/1999 | Wild | |
| 6,108,748 A | 8/2000 | Ofek et al. | |
| 6,230,239 B1 | 5/2001 | Sakaki et al. | |
| 6,269,382 B1 | 7/2001 | Cabrera et al. | |
| 6,282,619 B1 | 8/2001 | Islam et al. | |
| 6,434,682 B1 | 8/2002 | Ashton et al. | |
| 6,546,404 B1 * | 4/2003 | Davis et al. ........................... | 1/1 |
| 6,571,354 B1 | 5/2003 | Parks et al. | |
| 6,598,174 B1 | 7/2003 | Parks et al. | |

(Continued)

FOREIGN PATENT DOCUMENTS

EP        0614150        9/1994

(Continued)

OTHER PUBLICATIONS

Kimbleton et al. "Computer Communication Networks," ACM Computing Surveys 7: 129-173 (Sep. 1975). Japan Patent Office (JPO) office action dated Nov. 4, 2008 for JPO patent application JP2003-091225.

*Primary Examiner* — Wilson Lee
*Assistant Examiner* — Michael Le
(74) *Attorney, Agent, or Firm* — Kilpatrick Townsend & Stockton LLP

(57) ABSTRACT

The identification information about unnecessary files is registered to generate an unnecessary-file database. The identification information about files stored on a plurality of storage devices connected to a host computer is acquired to judge with the unnecessary-file database whether the identification information about files conforms to unnecessary-file conditions. Files nonconforming to the unnecessary-file conditions are checked to determine whether they are already migrated to a different storage device. If all the files stored on a storage device conform to the unnecessary-file conditions or are already migrated to a different storage device, the identification information about the former storage device is displayed to indicate that the storage device can be removed.

8 Claims, 12 Drawing Sheets

U.S. PATENT DOCUMENTS

| | | |
|---|---|---|
| 2003/0093439 A1 | 5/2003 | Mogi et al. |
| 2003/0212854 A1 | 11/2003 | Kitamura et al. |
| 2004/0015520 A1 | 1/2004 | Ogata et al. |
| 2004/0049553 A1 | 3/2004 | Iwamura et al. |
| 2004/0107315 A1 | 6/2004 | Watanabe et al. |
| 2004/0193800 A1 | 9/2004 | Krehbiel, Jr. et al. |
| 2004/0199609 A1* | 10/2004 | Papatla et al. ................. 709/220 |
| 2004/0210731 A1 | 10/2004 | Chatterjee et al. |

FOREIGN PATENT DOCUMENTS

| | | |
|---|---|---|
| JP | 08-44498 A | 2/1996 |
| JP | 11-085576 A | 3/1999 |
| JP | 2000-187608 | 7/2000 |
| JP | 2000-194508 A | 7/2000 |

* cited by examiner

FIG.5

| Directory | File name | Extension | Creation date/time | Update date/time | User | Device |
|---|---|---|---|---|---|---|
| | file1 | | | | user1 | M440 |
| | | tmp | <020202 13:15 | | ^user2 | |
| dir1 | | | | <030405 10:50 | | M440 |
| | | | | | | |
| | | | | | | |

| Device | Directory | File name | Extension | Creation date/time | Update date/time | User |
|---|---|---|---|---|---|---|
| M440 | dir1 | file1 | tmp | 020202 13:15 | 030405 10:50 | user1 |
| M440 | dir2 | file2 | txt | 030101 07:20 | 010303 16:30 | user2 |
| | | | | | | |
| | | | | | | |

| Directory | File name | Extension | Candidate conditions | Device |
|---|---|---|---|---|
|  | file1 |  |  |  |
|  |  | tmp | Updated today |  |
| dir1 |  |  | Created between 030220 and 030225 |  |
|  |  |  |  | M440 |
|  |  |  |  |  |

123

1230, 1231, 1232, 1233, 1234

| Directory | File name | Extension | Creation date/time | Update date/time | User | Device/ volume | Migration date/time | Migration destination device/migration destination volume |
|---|---|---|---|---|---|---|---|---|
| | file1 | tmp | 020202 13:15 | | user1 | M440 | 030502 08:25 | M550 |
| | | | | 030405 10:50 | user2 | M440 | 030606 14:20 | VOL01 |
| dir1 | | | | | | | | VOL03 |
| | | | | | | | | |

SYSTEM AND METHOD FOR IDENTIFYING A REMOVABLE STORAGE DEVICE

BACKGROUND OF THE INVENTION

The present invention relates to a support system for data migration suitable for providing support for efficiently migrating data from an old storage device to a new storage device and removing the old storage device within a computer system, particularly in a large-scale computer system, to which a plurality of storage devices are connected, a data migration support program, a method for identifying such a removable storage device, and a system for migrating data with a removable storage medium.

In an information system that handles a large amount of data, the capacity of a storage device for data storage needs to be large. The storage device capacity can be increased either by enlarging the size of an employed storage device or by using a large number of storage devices.

If it is anticipated that the stored information might be lost due to prolonged use of a storage device for a period longer than the estimated lifetime or if the storage device's defect detection rate is increased, the storage device is replaced with a new one that is less likely to deteriorate or become defective. Before the existing storage device is replaced, the data stored in it is transferred to another storage device. This transfer is called "data migration." The same is also true for optical disks and other storage media.

A generally employed data migration method is to back up the data on an existing storage device to a tape or other storage medium and then restore it to a new storage device. To make such a backup, it is necessary to halt a host computer's access to the existing storage device. If the existing storage device has a large capacity, the resulting access halt time for backup is long.

In a situation where the old existing storage device and a new migration destination storage device are connected to the host computer via a network, data migration can be achieved, for instance, by allowing individual users using the existing storage device to copy necessary data to the new storage device before the old storage device is replaced by the new storage device. For example, the storage devices disclosed by Japanese Patent Laid-open No. 2000-187608 accomplish data migration between the old and new storage devices on an individual file basis and without intervention of a host computer. U.S. Pat. Ser. No. 6,108,748 disclosed a migration destination storage device, which uses a table that indicates whether data elements are migrated. When a host computer issues a transfer request about one or more data elements, the disclosed migration destination storage device judges whether the data elements are already migrated. If the data elements are already migrated, the migration destination storage device responds to the transfer request. If, on the other hand, the data elements are not migrated, the migration destination storage device migrates the data elements, responds to the transfer request, and writes into the table to indicate that the data elements are now migrated. While there are no services or requests, the migration destination storage device migrates data elements in the background. Thus, data migration requests can be fulfilled immediately.

SUMMARY OF THE INVENTION

When replacing a large-capacity storage device or a large number of storage devices, it generally takes a long time to back up the whole data stored on an existing storage device to a tape or copy it to another storage device.

When the storage devices disclosed by Japanese Patent JP Laid-open No. 2000-187608 or U.S. Pat. No. Ser. 6,108,748 are used, it is possible to migrate data from an old storage device to a new storage device while accepting a processing request from a host computer and migrate data on an individual file basis. Since only desired data can be selectively migrated, the time required for data migration can be more or less reduced even when the storage devices store a large amount of data.

However, when a large-scale system is used so that data migration involves both a data owner and a system administrator, it is difficult to accurately determine whether data other than the selected migration data in the storage device to be removed is unnecessary.

Meanwhile, if the same data is duplicated in a large number of storage devices, it means that the storage devices are wasted unless such duplication aims at providing high-speed access or reliability enhancement. Even when the entire data stored on a certain storage device or storage medium is unnecessary or the same data is stored on another storage device, such storage device or storage medium may be left unremoved. However, such results are contrary to the demand for effective use of storage devices and storage media.

The present invention has been made to solve the above problems, and it is an object of the present invention to provide a method for providing support for data migration, identifying a removable storage device accurately and quickly, and identifying a storage medium that has completed data migration in a computer system to which a removable storage device or a storage device for storing data on a removable storage medium is connected.

To achieve the above object, a data migration support system according to the present invention is used, in a computer system to which a computer and a plurality of storage devices are connected or storage devices for storing data on a removable storage medium are connected, in order to register the identification information about unnecessary files, judge whether the files stored on a storage device or storage medium coincide with the registered unnecessary files, judge whether the files stored on the storage device or storage medium, if they are not unnecessary, are migrated to another storage device, and conclude, if all the files stored on the storage device or storage medium are unnecessary, that the storage device or the storage medium may be removed as migration is completed.

The above-mentioned unnecessary files are the files that need not be migrated. Such unnecessary files may be selectable from a list of unnecessary-file candidates that meet certain conditions.

If an unnecessary file is specified, its identification information is registered to generate an unnecessary-file database. When a judgment needs to be formulated, the identification information about files stored on a plurality of storage devices is acquired, and the unnecessary-file database is used to judge whether the identification information about the files matches the unnecessary-file conditions.

A data migration history may be referenced or a file duplicately stored on another storage device or storage medium may be checked for in order to judge whether the file is migrated to another storage device or storage medium.

Files stored on the storage device or storage medium identified as described above are unnecessary, that is, need not be migrated or are already migrated. Therefore, the system administrator can remove the storage device or storage medium in compliance with system instructions.

BRIEF DESCRIPTION OF THE DRAWINGS

FIG. 5 is a schematic diagram that shows a typical format of an unnecessary-file table;

FIG. 6 is a schematic diagram that shows a typical format of a storage-device-specific file table;

FIG. 7 is a schematic diagram that shows a typical format of an unnecessary-file candidate table;

DETAILED DESCRIPTION OF THE PREFERRED EMBODIMENTS

Preferred embodiments of the present invention will be described below with reference to FIGS. 1 through 16.

A first embodiment of the present invention will now be described with reference to FIGS. 1 through 12.

(I) Data Migration Support System Configuration

First of all, the configuration of a data migration support system according to the first embodiment will be described with reference to FIGS. 1 through 3.

Figure 1:
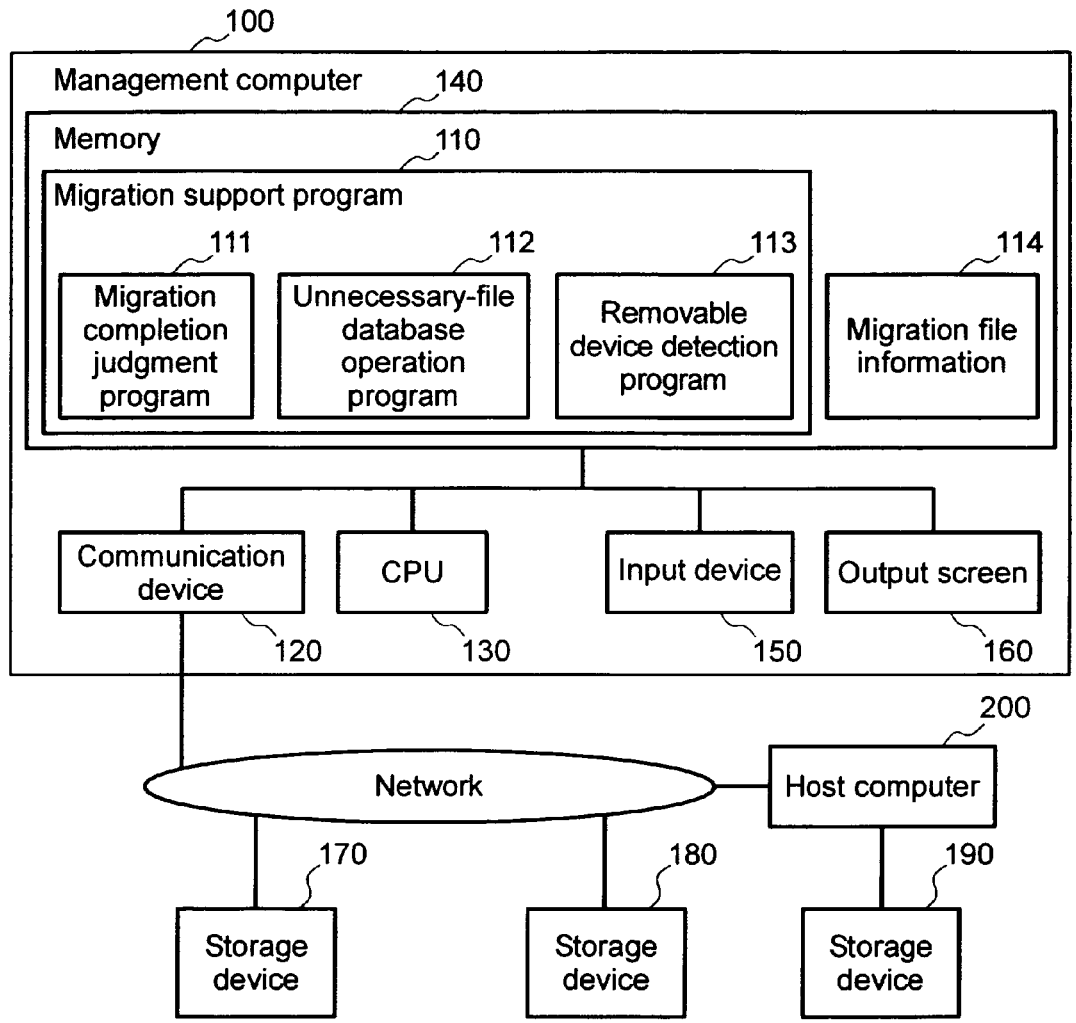
FIG. 1 illustrates the configuration of a data migration support system according to a first embodiment of the present invention.

FIG. 1 illustrates the configuration of the data migration support system according to the first embodiment of the present invention. FIG. 2 is a hardware configuration diagram of a host computer 200 for the data migration support system according to the first embodiment of the present invention. FIG. 3 is a hardware configuration diagram of a storage device 170 that is directly connected to a network for the data migration support system according to the first embodiment of the present invention.

The data migration support system according to the first embodiment configured so that a management computer 100, a host computer 200, and storage devices 170 and 180 are interconnected via a network. The host computer 200 is also connected to a storage device 190.

Data migration may be performed by the storage devices 170 and 180, which are directly connected to the network, or by the storage device 190, which is connected to the host computer.

To be more precise, the storage device 170 is a disk array device or a NAS (Network Attached Storage). The storage device 190 is, for instance, an external SCSI hard disk drive.

The disk array device provides data migration for each disk volume to be replaced, whereas the external hard disk drive provides data migration for the entire hard disk drive.

The host computer 200 executes a processing program while accessing the data stored on the storage devices 170, 180, and 190.

The management computer 100 comprises a memory 140, a communication device 120, a CPU 130, an input device 150, and an output screen 160.

A migration support program 110 is loaded into the memory 140 for execution. The migration support program 110 has a migration completion judgment program 111, an unnecessary-file database operation program 112, and a removable device detection program 113 as subroutines. It performs data migration in accordance with a migration file 114 in the memory 140. The operations of these programs and the structure of the migration file 114 will be described in detail later.

The foregoing description assumes that the present embodiment performs data migration by running the migration support program 110 on the management computer. However, the migration support program 110 may alternatively be executed on the host computer 200, which runs an application that handles files. Another alternative is to furnish the storage device 170 with a data migration function or provide the system with a dedicated data migration support device.

Figure 2:
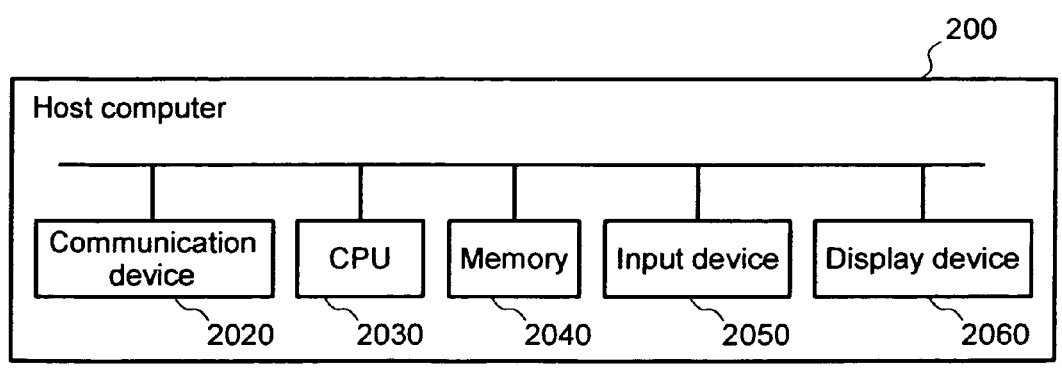
FIG. 2 is a hardware configuration diagram of a host computer for the data migration support system according to the first embodiment of the present invention.
Figure 3:
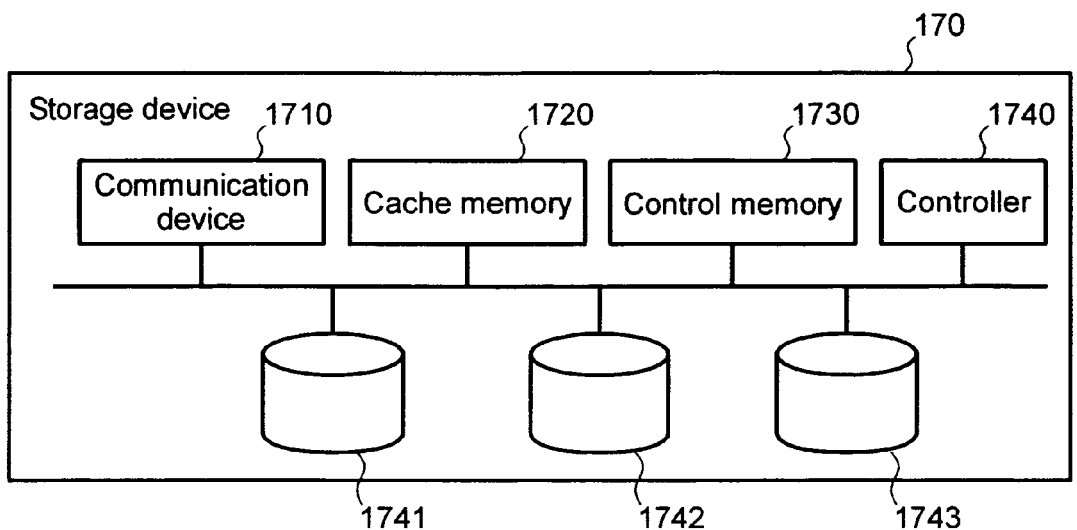
FIG. 3 is a hardware configuration diagram of a storage device that is directly connected to a network for the data migration support system according to the first embodiment of the present invention.

As shown in FIG. 2, the hardware configuration for the host computer 200 includes a CPU 2030, a memory 2040, a communication device 2020 for communicating with the network, an input device 2050, and a display device 2060.

The CPU 2030 creates a necessary file by executing, for instance, a business program. The input device 2050 is used to enter a command or data for executing the business program. The display device 2060 displays the processing results of the business program.

The storage device 170, which is directly connected to the network, comprises a controller 1740, a communication device 1710, a cache memory 1720, a control memory 1730, and normally a plurality of disk drives 1741, 1742, 1743, and so on.

The controller 1740 is capable of controlling the components of the storage device 170. The cache memory 1720 caches data to permit high-speed access to the disk drives 1741, 1742, 1743, and so on. The control memory 1730 caches control data for use in the controller.

Files and other data are stored on the disk drives 1741, 1742, 1743, and so on. Removal is performed on an individual disk drive basis.

(II) Migration File Information

The structure of file migration information for the data migration support system according to the present embodiment will now be described with reference to FIGS. 4 through 7.

Figure 4:
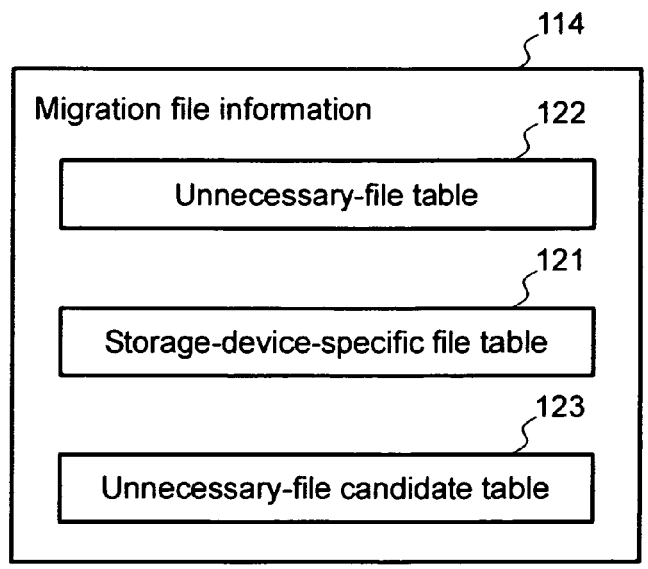
FIG. 4 is a schematic diagram that illustrates the constituent elements of migration file information according to the first embodiment of the present invention.

FIG. 4 is a schematic diagram that illustrates the constituent elements of migration file information 114 according to the first embodiment of the present invention. FIG. 5 is a schematic diagram that shows a typical format of an unnecessary-file table 122. FIG. 6 is a schematic diagram that shows a typical format of a storage-device-specific file table 121. FIG. 7 is a schematic diagram that shows a typical format of an unnecessary-file candidate table 123.

The migration file information 114 for data migration support may vary with the system specifications. The present embodiment, however, assumes that the migration file information 114 comprises three tables: an unnecessary-file table 122, a storage-device-specific file table 121, and an unnecessary-file candidate table 123. The migration file information 114 can be stored on storage device 170, 180, or 190, which are targeted for data migration.

When the storage device 170, 180, or 190 is to be removed, the user uses the unnecessary-file table 122 to register an unnecessary file, that is, the identification information about a file that need not be migrated, by executing the unnecessary-file database operation program 112. Storing the name of a file in the unnecessary-file table 122 does not mean that the file is to be deleted. It will be simply concluded that the file need not be migrated at the time of data migration.

The unnecessary-file candidate table 123, on the other hand, is an area for storing the conditions for file candidates that may be unnecessary in the future, that is, need not be migrated although it cannot be presently deemed unnecessary.

The storage-device-specific file table 121 is used to register the identification information about files that are stored in the storage device 170, 180, or 190, which is connected to the network. This registration is performed on an individual storage medium basis.

As shown in FIG. 5, the unnecessary-file table 122 comprises a directory field 1220, a file name field 1221, an extension filed 1222, a creation date/time field 1223, an update date/time field 1224, a user field 1225, and a device field 1226.

The directory field 1220, file name field 1221, and extension field 1222 respectively store the directory name, file name, and extension of an unnecessary file.

The creation date/time field 1223 and update date/time field 1224 respectively store the creation date/time and update date/time of the unnecessary file.

The user field 1225 stores the name of a person who owns the unnecessary file. The device field 1226 stores the identifier of a storage device on which the unnecessary file is stored.

As shown in FIG. 6, the storage-device-specific file table 121 comprises a device field 1210, a directory field 1211, a file name field 1212, an extension field 1213, a creation date/time field 1214, an update date/time field 1215, and a user field 1216. This table indicates that a file having attributes indicated in the directory field 1211, file name field 1212, extension field 1213, creation date/time field 1214, update date/time field 1215, and user field 1216 are stored on a storage device corresponding to a device identifier stored in the device field 1210. The table is used to check whether duplicate files are stored on a storage device.

Further, an expression and wildcard character can be specified in the fields of the unnecessary-file table 122. In the example shown in FIG. 5, a negation symbol is used in the user field 1225 to specify users other than "user2." An inequality sign is used in the creation date/time field 1223 and update date/time field 1224 to indicate dates/times earlier than the entered date/time.

An update needs to be performed each time a file stored on the storage device 170, 180, or 190 is accessed.

When file information stored on a storage device is to be directly accessed to check for duplicate files on a storage device, the storage-device-specific file table 121 need not be furnished.

The unnecessary-file candidate table 123 comprises a directory candidate field 1230, a file name candidate field 1231, an extension candidate field 1232, a candidate condition field 1233, and a device candidate field 1234.

The directory candidate field 1230, file name candidate field 1231, and extension candidate field 1232 respectively store the directory name, file name, and extension of an unnecessary-file candidate. If nothing is specified in these fields, all files are regarded as matching items. If, for instance, "file1" is specified in the file name candidate field 1231 as in the first record, files that are stored on storage devices targeted for the system and named "file1" will be regarded as unnecessary-file candidates without regard to the directory or extension. Further, wildcard characters such as "*" and "?" can be used.

The candidate condition field 1233 is used to specify the conditions for unnecessary-file candidates. For example, it is possible to specify "files created today" or files updated between certain dates.

(III) Data Migration Support Process

The process for data migration support is described below with reference to FIGS. 8 through 12.

(III-1) Unnecessary-file Database Process

The process for an unnecessary-file database will now be described with reference to FIGS. 8 through 10.

Figure 8:
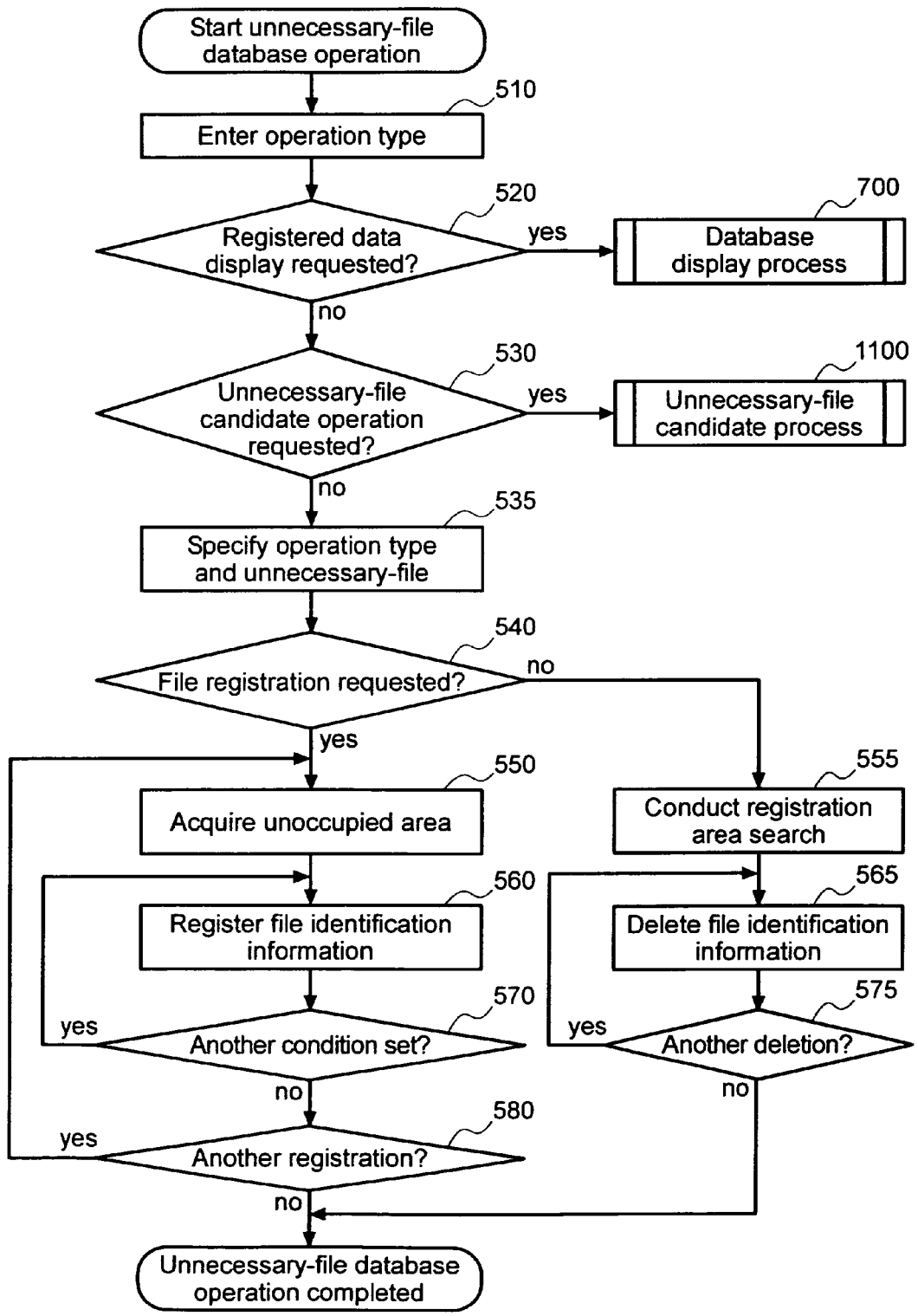
FIG. 8 is a flowchart that illustrates a process for unnecessary-file database operations.

FIG. 8 is a flowchart that illustrates a process for unnecessary-file database operations. The unnecessary-file operations that can be performed by the user are registering an unnecessary file, displaying databased information, and displaying/registering unnecessary-file candidates.

The unnecessary-file database operation program 112 is used to perform unnecessary-file database operations.

To operate the unnecessary-file database, the user uses the input device 150 to issue instructions for starting an unnecessary-file database operation and enter the type of operation (step 510).

If the type of operation is a request for registered data display (step 520), the system proceeds to perform an unnecessary-file database display process (step 700). The unnecessary-file database display process will be described in detail later.

If the type of operation is a request for unnecessary-file candidate operation (step 530), the system proceeds to perform an unnecessary-file candidate process (step 1110). The unnecessary-file candidate process will also be described in detail later.

If the type of operation is neither of the above two, the user selects either unnecessary-file registration or unnecessary-file deregistration as the type of operation and specifies the target unnecessary file (step 535).

The unnecessary file can be designated by uniquely specifying its directory name, file name, and extension. An alternative is to specify the unnecessary-file conditions, for instance, by designating all files having a certain extension or all files in subdirectories under a certain directory. It is also possible to specify the unnecessary-file conditions, for instance, by designating all files that were created during a certain period of time and left unaccessed during a certain period of time.

If an operating instruction entered in step 535 is for registration (step 540), the system acquires an unoccupied entry area within the unnecessary-file table 122 (step 550) and writes unnecessary-file identification information in that area (step 560).

Since two or more sets of conditions may be combined for specifying unnecessary files as described above, the system checks for some other specified conditions (step 570). If it is found in step 570 that some other conditions are specified, the system returns to step 560. If it is found in step 570 that no other conditions are specified, the system checks whether the registration of any other file is specified (step 580). If it is found in step 580 that another unnecessary file needs to be registered, the system returns to step 550.

On the other hand, if it is found in step 540 that the deregistration of an unnecessary file is specified, the system searches the unnecessary-file information registered in the unnecessary-file table 122 for the unnecessary-file information entry to be deleted (step 555). When such an entry is detected in step 555, the system deletes the file identification information about the detected entry (step 565), and then checks whether any other file identification information needs to be deleted in compliance with instructions (step 575). If it is found in step 575 that some other file identification information needs to be deleted, the system returns to step 565. On the other hand, if it is found in step 575 that no other file identification information needs to be deleted, the system terminates the process.

Next, the unnecessary-file database display process, which is performed in step 700, will be described in detail with reference to FIG. 9.

Figure 9:
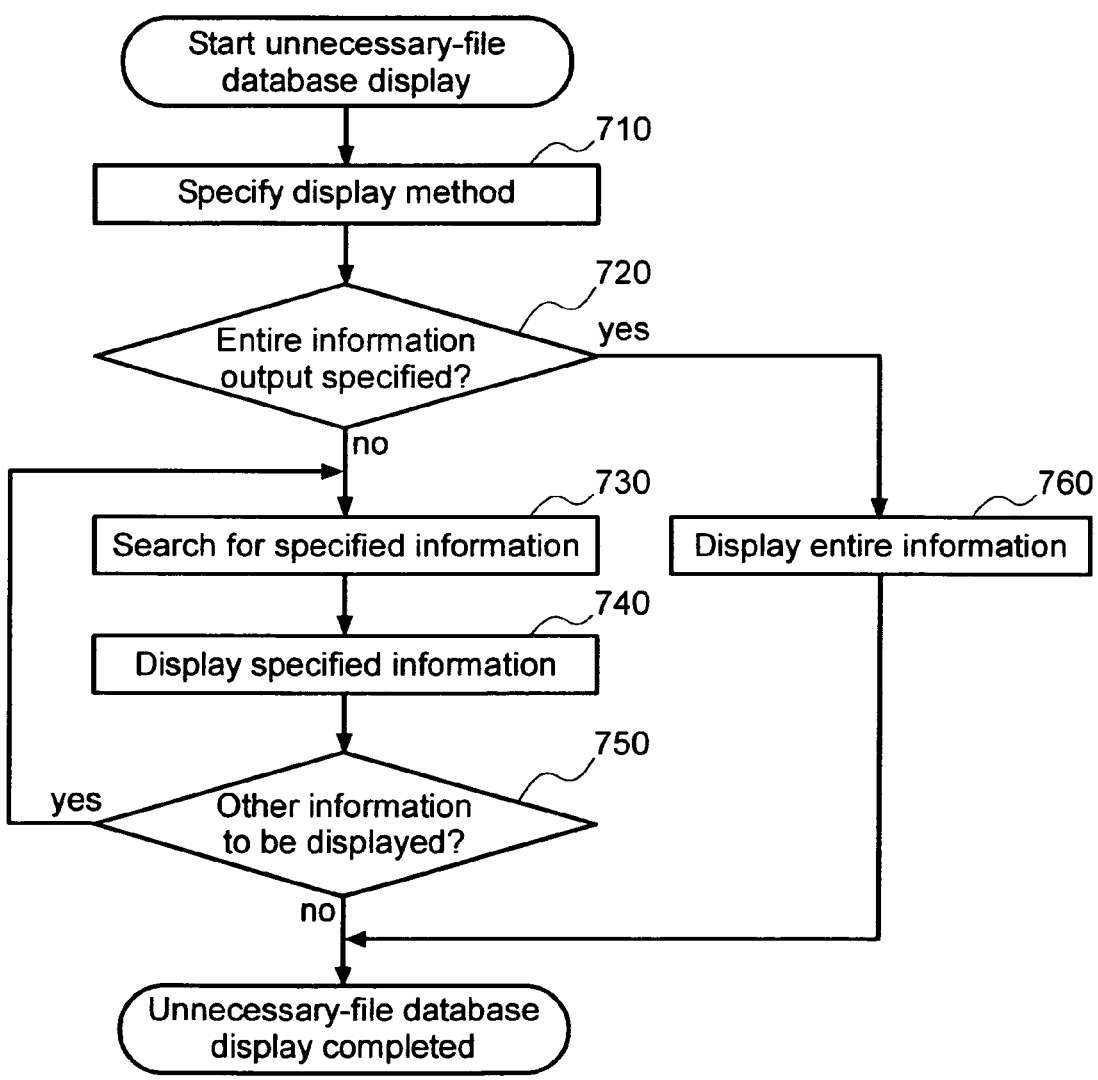
FIG. 9 is a flowchart that illustrates an unnecessary-file database display process.

FIG. 9 is a flowchart that illustrates the unnecessary-file database display process.

First of all, the input device 150 is used to make an entry to specify the unnecessary-file display method (step 710). For unnecessary-file display purposes, it is possible, for instance, to specify all unnecessary files, specify unnecessary files contained in a certain directory, or specify unnecessary files having a certain extension.

The system checks whether the entry made in step 710 specifies the output of the entire information (step 720). If the entry specifies the output of the entire information, the output screen 160 displays all the unnecessary-file entries registered in the unnecessary-file table 122 (step 760).

If it is found in step 720 that the entry stipulates specific display conditions, the system searches the entries registered in the unnecessary-file table 122 for entries conforming to the entered conditions (step 730) and displays them on the output screen 160 (step 740).

The system then checks whether any other display instructions are entered (step 750). If it is found that some other display instructions are entered, the system returns to step 730. If there are no more display instructions, the system terminates the process.

The unnecessary-file candidate process, which is performed in step 1100, will now be described with reference to FIG. 10.

Figure 10:
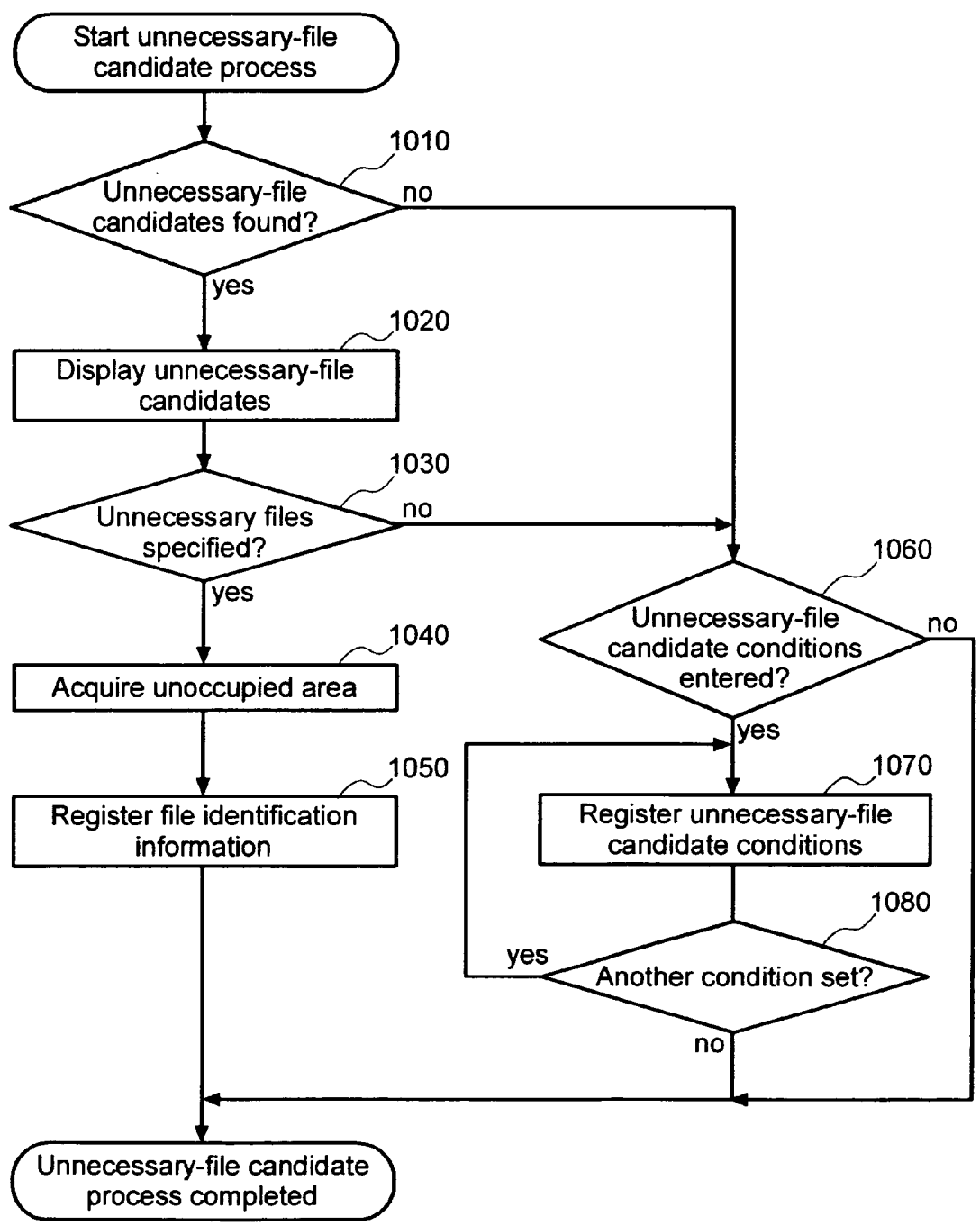
FIG. 10 is a flowchart that illustrates an unnecessary-file candidate process.

FIG. 10 is a flowchart that illustrates the unnecessary-file candidate process.

If any files conform to the unnecessary-file candidate conditions (step 1010), the system displays them in a candidate list (step 1020).

The user can view the candidate list and specify unnecessary-file entries, for instance, by putting a check mark on them (step 1030).

When the unnecessary files are specified, the system acquires an unoccupied area as needed from the unnecessary-file table 122 (step 1040) and registers file identification information (step 1050).

If it is found that unnecessary-file candidate conditions are entered (step 1060), the system registers the entered unnecessary-file candidate conditions in the unnecessary-file candidate table 123 (step 1070).

The unnecessary-file candidate conditions may be defined by specifying the directory name, file name, and extension or by specifying all the files having a certain extension as the candidates. As described above, the user is prompted to roughly specify the unnecessary-file candidates and then select actual unnecessary files.

The system repeats the above sequence until all the conditions are completely entered (step 1080).

(III-2) Data Migration Completion Judgment Process

A data migration completion judgment process according to the first embodiment will now be described with reference to FIG. 11.

Figure 11:
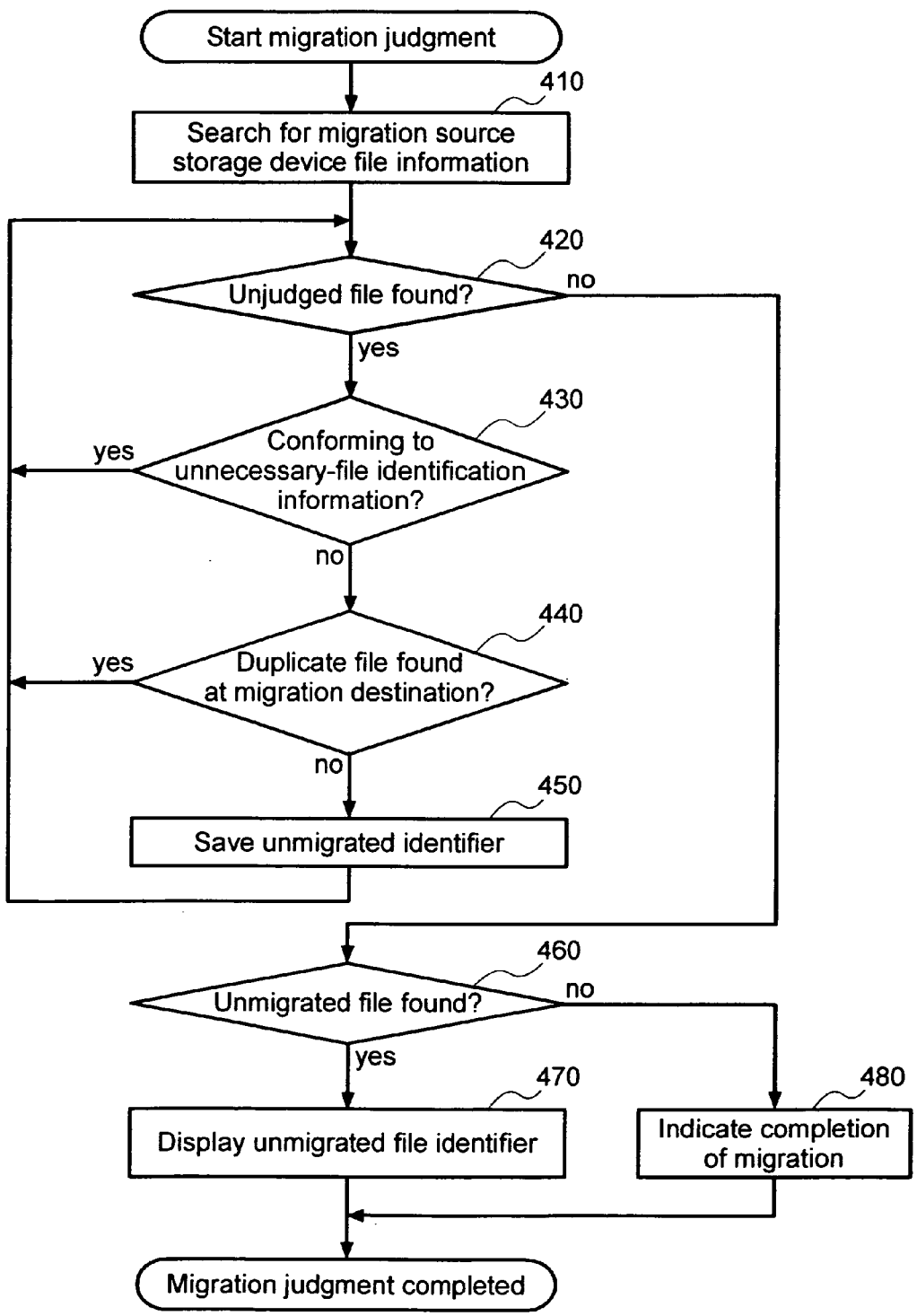
FIG. 11 is a flowchart that illustrates a data migration completion judgment process according to the first embodiment of the present invention.

FIG. 11 is a flowchart that illustrates the data migration completion judgment process according to the first embodiment.

It is assumed that the storage device 170 serves as a migration source storage device, and that the storage device 180 serves as a migration destination storage device. First of all, the system uses the device identifier of the storage device 170 as a key to search the device field 1210 of the storage-device-specific file table 121 for the information about files stored on the storage device 170 (step 410). The system then checks whether the storage-device-specific file table 121 contains an entry having the device identifier of the storage device 170 (step 420). If it is judged that such an entry is contained, the system checks the unnecessary-file table 122 to determine whether the entry's file information in fields 1210 through 1215 is registered (step 430).

If it is found in step 430 that the file information is not registered in the unnecessary-file table 122, the system searches the storage-device-specific file table 121 for the file information stored on the storage device 180, which is used as the migration destination storage device (step 440). Since the migration destination storage device is the storage device 180, step 440 is performed to search the device field 1210 and file name field 1212 of the storage-device-specific file table 121 while using the identifier of the storage device 180 and a file name as keys.

To investigate the files at the migration destination file, the present embodiment checks the contents of the storage-device-specific file table 121. Alternatively, however, the system may directly send an inquiry as needed to the file system for the migration destination storage device without furnishing such a storage-device-specific file table.

If it is not confirmed in step 440 that a file has been migrated to the storage device 180, which is the migration destination storage device, the file is not an unnecessary file and does not exist on the migration destination storage device. It is therefore concluded that the file is not migrated. The system then saves the file identifier of the file into a memory 110 (step 450) and returns to step 420.

When all the files are judged and the system concludes that there is no unjudged file on the migration source storage device (step 420), the system judges whether unmigrated file identifiers are saved in the memory 110 (step 460). When it is judged that the unmigrated files are saved, the system displays the unmigrated file identifiers on the output screen 160 (step 470). If, on the other hand, it is judged in step 460 that the unmigrated files are not saved, the system causes the output screen 160 to indicate that the files stored on the migration source storage are completely migrated (step 480).

In step 470 and step 480, the system may notify the file migration judgment result to the host computer 200. If the host computer 200 receives this notification from the management computer 100, the host computer 200 can synchronize the operation of the application with the completion of the file migration. Moreover, the file migration judgment result can be shared between computers.

(III-3) Removable Storage Device Detection Process

A removable storage device detection process will now be described with reference to FIG. 12.

Figure 12:
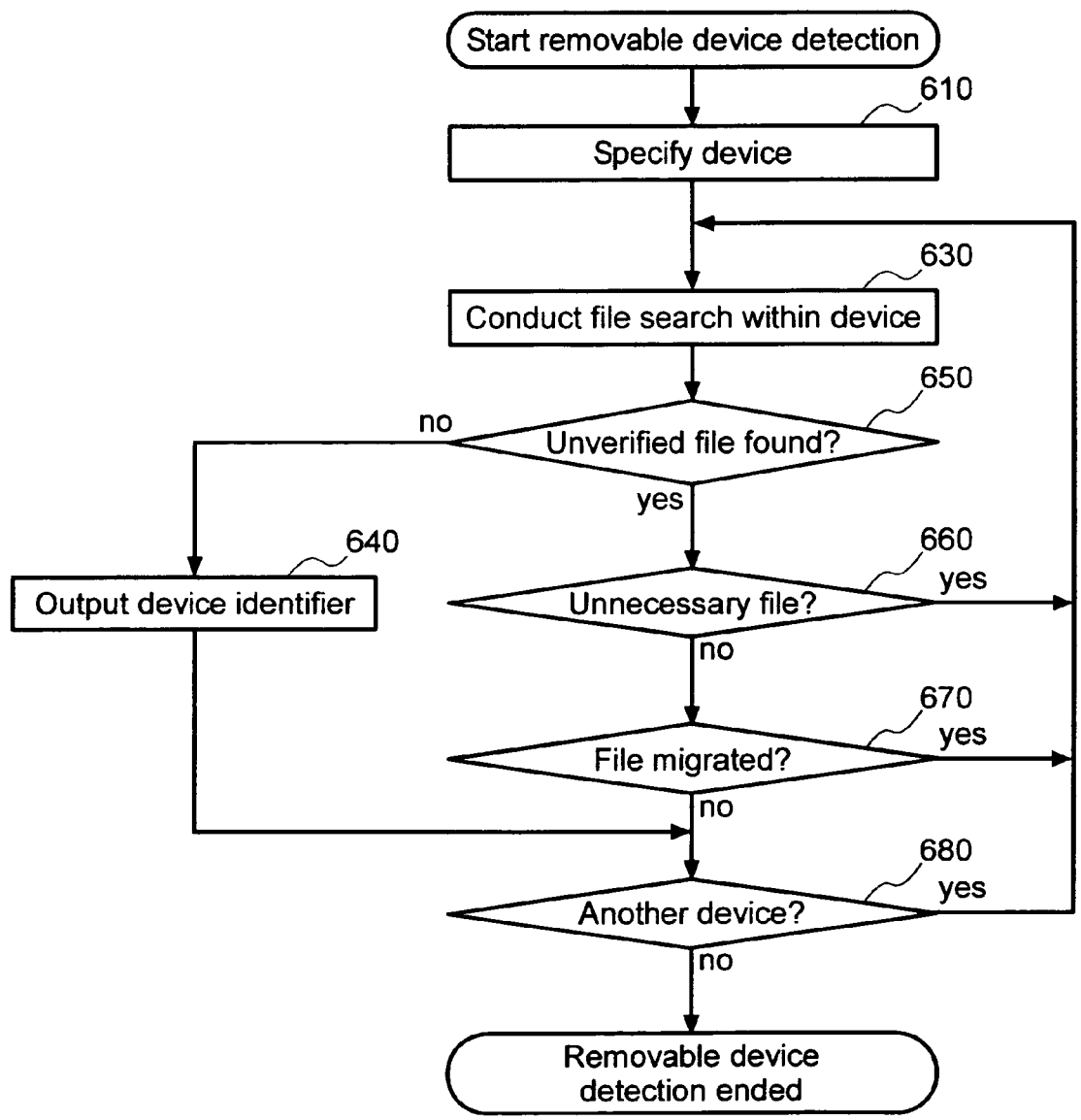
FIG. 12 is a flowchart that illustrates a removable storage device detection process.

FIG. 12 is a flowchart that illustrates the removable storage device detection process.

When all the files stored on a storage device existing in the system are migrated to another storage device or unnecessary, the former storage device can be removed. In the removable storage device detection process, the identification information about the target storage device to be checked for removability is first entered (step 610).

Next, the storage-device-specific file table 121 is used to search the files stored on the target storage device (step 630) to check whether any file information indicate that migration verification is not finished (step 650). When it is concluded in the data migration completion judgment process (III-2) that data migration is completed, it means that migration verification is finished.

If any unverified file is found in step 650, the system checks whether the file is unnecessary. This check is performed by judging whether it conforms to the entry conditions in the unnecessary-file table 122 (step 660). If it is found in step 660 that the file is unnecessary, the system returns to step 630. If, on the other hand, it is found in step 660 that the file is not unnecessary, the system checks whether the file is already migrated to another storage device (step 670). When a file having the same contents as the checked file is found on another storage device in step 670, the system returns to step 630. If it is found in step 670 that the file is not migrated, the system concludes that the currently investigated target storage device is not removable, and then proceeds to investigate another storage device.

In step 680, the system checks whether all the devices specified in step 610 have been investigated. If it is found in step 680 that a certain device is still not investigated, the system returns to step 630. If, on the other hand, it is found in step 680 that no more devices are to be investigated, the system terminates the process.

If it is found in step 650 that there are no more unverified files, the system concludes that the currently investigated target storage device is removable, displays the identification information about the removable storage device on the output screen 160 (step 640), and proceeds to step 680.

A second embodiment will now be described with reference to FIGS. 13 through 16.

(I) Data Migration Support System Configuration

First of all, the configuration of a data migration support system according to a second embodiment will be described with reference to FIG. 13.

Figure 13:
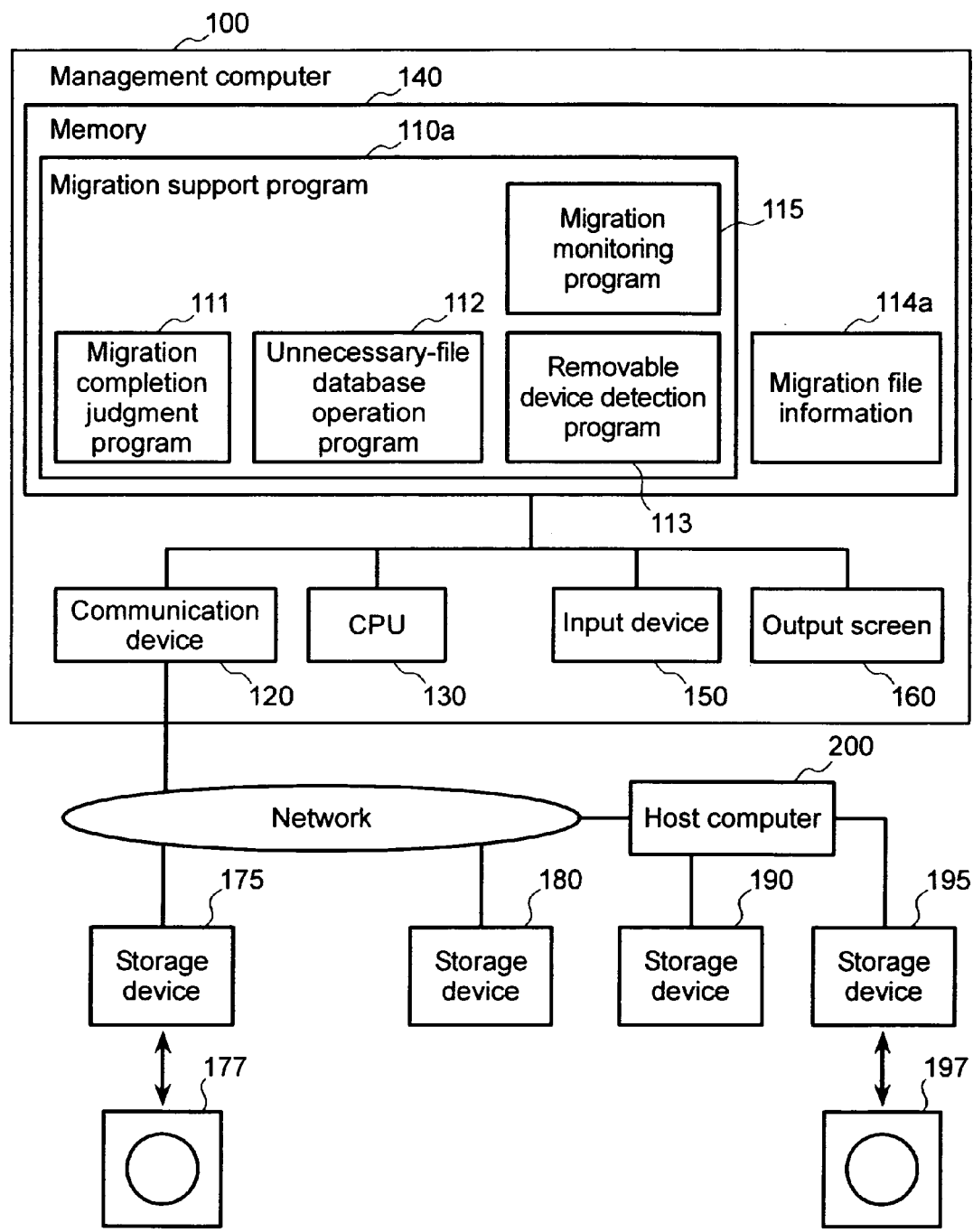
FIG. 13 illustrates the configuration of a data migration support system according to a second embodiment of the present invention.

FIG. 13 illustrates the configuration of the data migration support system according to the second embodiment of the present invention.

In the first embodiment, the storage device 170, which is typically a network-connected disk array device, or the storage device 190, which is typically an external hard disk drive connected to a host computer, is targeted for data migration. In the second embodiment, however, a storage device storing data on a storage medium can also be targeted for data migration.

As is the case with the data migration support system according to the first embodiment of the present invention, the data migration support system according to the second embodiment is also connected to a data migration support system management computer 100 and a host computer 200.

The second embodiment differs from the first embodiment in connected storage devices. More specifically, storage devices 175 and 180 are connected to a network, and storage devices 190 and 195 are connected to the host computer 200.

The storage devices 175 and 195 store data on a removable storage medium 177 or 197. Available removable storage media include optical disks such as an MO (Magneto-Optical) disk, CD (Compact Disk), and DVD (Digital Versatile Disk), magnetic disks such as an MT (Magnetic Tape) and floppy (registered trademark) disk, and semiconductor memories such as a flash memory card.

As the storage device 175, which is connected to the network, an optical disk library device or MT library device may be typically used. As the storage device connected to the host computer 200, a SCSI MO disk drive or PC card device may be typically used.

The second embodiment is similar to the first embodiment in that the data migration support program runs on the management computer 100. However, the second embodiment differs from the first embodiment in that a migration monitoring program 115 is added to the data migration support program used in the first embodiment.

The first embodiment verifies the completion of data migration by checking whether a duplicate file exists on the migration destination storage device. The second embodiment, however, causes the migration monitoring program 115 to store a migration history in the area for file migration information 114a at the time of data migration, and references such a migration history to judge whether data migration is completed.

Further, the migration support program 110a may be executed by the host computer 200, or storage device 175, 180, 190, or 195 as is the case with the first embodiment.

(II) Migration File Information

The structure of file migration information for the data migration support system according to the present embodiment will now be described with reference to FIGS. 14 and 15.

Figures 14, 15:
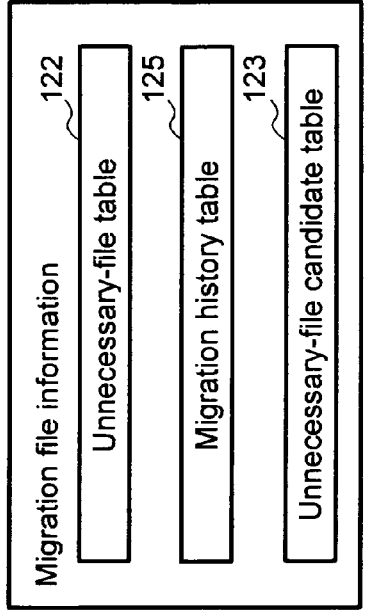
FIG. 14 is a schematic diagram that illustrates the constituent elements of migration file information according to the second embodiment of the present invention.
FIG. 15 is a schematic diagram that shows a typical format of a migration history table.

FIG. 14 is a schematic diagram that illustrates the constituent elements of migration file information 114a according to the second embodiment. FIG. 15 is a schematic diagram that shows a typical format of a migration history table 125.

The migration file information 114a according to the present embodiment comprises an unnecessary-file table 122, an unnecessary-file candidate table 123, and a migration history table 125. Unlike the first embodiment, the migration file information according to the present embodiment does not have the storage-device-specific file table 121 but newly incorporates the migration history table 125. The migration file information 114a can be stored on storage medium 177 or 197, which is targeted for data migration.

The structures of the unnecessary-file table 122 and unnecessary-file candidate table 123 and the processes performed on these tables are the same as those of the first embodiment. However, the storage device field can additionally store a volume identifier to permit the use of a storage medium.

The migration history table 125 comprises a directory field 1250, a file name field 1251, an extension field 1252, a creation date/time field 1253, an update date/time field 1254, a user field 1255, a device/volume field 1256, a migration date/time field 1257, and a migration destination device/migration destination volume field 1258.

The directory field 1250, file name field 1251, extension field 1252, creation date/time field 1253, update date/time field 1254, and user field 1255 are the same as those stated in the previous description of the file information.

The device/volume field 1256 stores the identifier of a device or the volume identifier of a storage medium in order to indicate the storage location that is used before migration.

The migration date/time field 1257 stores the date/time of migration. The migration destination device/migration destination volume field 1258 stores the identifier of a migration destination storage device when the migration destination is a storage device or the volume identifier of a migration destination storage medium when the migration destination is a storage medium.

For data migration according to the present embodiment, the storage-device-specific file table 121 need not be used if the migration source directly accesses the file information and the migration destination stores a migration history in the migration history table 125 and references it.

(III) Data Migration Support Process

The process for data migration support is the same as described in conjunction with the first embodiment except that a storage medium can be used at the migration source and migration destination and that the migration history table 125 is used for migration judgment.

When data migration is performed, it is necessary to store in the migration history table 125 the information about a migrated file, the date/time of migration, and the volume information about a storage device or storage medium used for migration.

The data migration completion judgment process according to the second embodiment will now be described with reference to FIG. 16.

Figure 16:
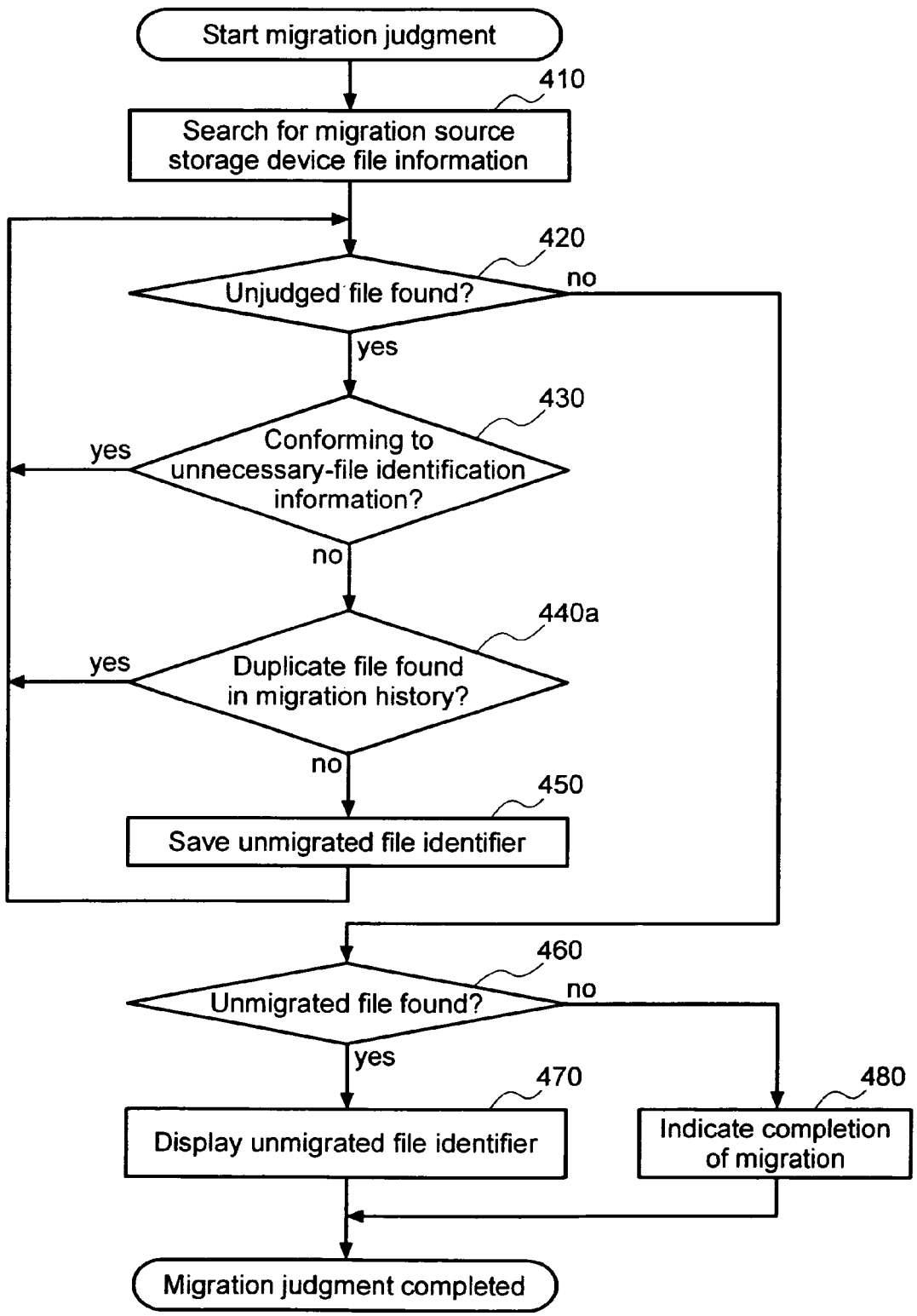
FIG. 16 is a flowchart that illustrates a data migration completion judgment process according to the second embodiment of the present invention.

FIG. 16 is a flowchart that illustrates the data migration completion judgment process according to the second embodiment, which is basically the same as the counterpart of the first embodiment. However, the data migration completion judgment process according to the second embodiment references the migration history table for migration destination judgment purposes and determines whether migration is terminated (step 440a).

The present invention provides a method for providing support for data migration, identifying a removable storage device accurately and quickly, and identifying a storage medium that has completed data migration in a computer system to which a removable storage device or a storage device for storing data on a removable storage medium is connected.

What is claimed is:

1. A method for identifying a removable storage device within a computer system that can be connected to a computer and a plurality of storage devices, the method comprising steps of:

acquiring identification information about a file stored on one of the plurality of said storage devices and migration file information, wherein said identification information includes an extension, a creation date and time, and an update date and time for the file, and said migration file information includes a storage-device-specific file table, an unnecessary-file table that identifies files stored on said one of the plurality of storage devices that are unnecessary, and an unnecessary-file candidate table that identifies unnecessary-file conditions under which candidate files stored on said one of the plurality of storage devices conforming to the unnecessary-file conditions are registered in the unnecessary-file table in response to being specified as files that need not be migrated;

judging whether the migration file information about the file on one of the plurality of storage devices indicates that migration verification for the file is not finished by referring to the storage-device-specific file table;

judging, when the migration verification is indicated as not finished, based on referring to the unnecessary-file table, whether said migration file information about said file stored on said one of the plurality of said storage devices indicates that said file conforms to the unnecessary-file conditions;

judging, when said identification information about said file stored on said one of the plurality of storage devices does not conform to the unnecessary-file conditions, whether said file stored on said one of the plurality of storage devices is already migrated to another storage device; and if all the files stored on said one of the plurality of storage devices are in the unnecessary-file table, or are already migrated to said another storage device though files stored on said one of the plurality of storage devices do not conform to the unnecessary-file conditions, then generating identification information about said one of the plurality of storage devices as a removable device.

2. The method according to claim 1, further comprising the step of prompting a user to select an entry file from the unnecessary-file candidate table in order to register said migration file information about said entry file in the unnecessary-file table.

3. The method according to claim 1, wherein said removable storage device includes an unnecessary-file table and a migration history as migration file information for providing data migration support.

4. A method for identifying a storage medium that has completed data migration for a computer system to which a computer and a storage device for storing data on a removable storage medium are connected, the method comprising the steps of:

acquiring identification information about a file stored on said storage medium and migration file information, wherein said identification information includes an extension, a creation date and time, and an update date and time for the file, and said migration file information includes a storage-device-specific file table, and an unnecessary-file table that identifies files stored on said one of the plurality of storage devices that are unnecessary;

an unnecessary-file candidate table that identifies unnecessary-file conditions under which candidate files stored on said one of the plurality of storage devices conforming to the unnecessary-file conditions are registered in the unnecessary-file table in response to being specified as files that need not be migrated;

judging whether the migration file information about the file on said storage medium indicates that migration verification for the file is not finished by referring to the storage-device-specific file table;

judging, when the migration verification is indicated as not finished, based on referring to said unnecessary-file table, whether said migration file information about said file stored on said storage medium indicates that said file conforms to the unnecessary-file conditions;

judging, when said identification information about said file stored on said storage medium does not conform to the unnecessary-file conditions, whether a file corresponding to said identification information about said file stored on said storage medium, that is stored in said unnecessary-file table, is already migrated to another storage device; and generating, if all files stored on said storage medium are in the unnecessary-file table, or are already migrated to another storage device though files stored on said storage medium do not conform to the unnecessary-file conditions, identification information about said storage medium.

5. The method according to claim 4, further comprising prompting a user to select an entry file from the unnecessary-file candidate table for the purpose of registering identification information about said selected entry file in the unnecessary-file table.

6. The method according to claim 4, wherein said removable storage medium includes an unnecessary-file database and a migration history as migration file information for providing data migration support.

7. A system, comprising:
a first computer;
a storage device connected to said first computer;
another storage device connected to said first computer; and
a second computer connected via a network to said first computer and said another storage device;
wherein said storage device acquires a history of file transfer to said another storage device;
wherein said second computer comprises a controller, a memory, a communication device connected to said network, and a display unit; and
wherein said controller:
registers identification information about unnecessary files, which identification information includes an extension, a creation date and time, and maintains migration file information comprising an unnecessary-file table that identifies files stored on said storage device that are unnecessary, an unnecessary-file candidate table that identifies unnecessary-file conditions under which candidate files stored on said storage device that conform to the unnecessary-file conditions are registered in the unnecessary-file table in response to being specified as files that need not be migrated, and a storage-device-specific file table, with said memory;

judges whether files stored on said storage device coincides with said registered unnecessary files;

judges whether the migration file information about the file on said storage devices indicates that migration verification for the files is not finished by referring to the storage-device-specific file table;

acquires, when the migration file information about the file indicates that verification is not finished, said file transfer history from said storage device via said network and said communication device if the files stored on said storage device do not match the migration file information about said unnecessary-file conditions;

judges whether the files stored on said storage device are migrated to another storage device; and if the migration file information for each file stored on said storage device indicates that each file is a registered unnecessary file or file migrated to said another storage device though the file is not said registered unnecessary file, the controller displays information on said display unit to indicate that said storage device is identified as a removable storage device.

8. The system according to claim 7, wherein said controller prompts a user to select a file entry from the unnecessary-file candidate table and in response registers migration file information about said selected file entry in the unnecessary-file table.

* * * * *